United States Patent
Kamada

(10) Patent No.: US 9,534,421 B2
(45) Date of Patent: Jan. 3, 2017

(54) ENGAGING MECHANISM

(71) Applicant: AKUSESU CORPORATION, Konan-shi, Shiga (JP)

(72) Inventor: Katsuzo Kamada, Konan (JP)

(73) Assignee: AKUSESU CORPORATION, Konan-shi (JP)

( * ) Notice: Subject to any disclaimer, the term of this patent is extended or adjusted under 35 U.S.C. 154(b) by 414 days.

(21) Appl. No.: 14/079,309

(22) Filed: Nov. 13, 2013

(65) Prior Publication Data
US 2015/0132053 A1    May 14, 2015

(51) Int. Cl.
| | | |
|---|---|---|
| E05B 65/00 | (2006.01) | |
| F16B 21/07 | (2006.01) | |
| F16B 21/08 | (2006.01) | |
| A47B 88/04 | (2006.01) | |

(52) U.S. Cl.
CPC .......... *E05B 65/0014* (2013.01); *E05B 65/00* (2013.01); *F16B 21/071* (2013.01); *F16B 21/088* (2013.01); *A47B 88/04* (2013.01); *Y10T 403/7073* (2015.01)

(58) Field of Classification Search
CPC ....... F16B 17/00; F16B 21/088; F16B 21/071; E05B 65/00; A47B 88/04
USPC ... 292/95, 96, 100, 121, 126, 200, 219, 226, 292/DIG. 61
See application file for complete search history.

(56) References Cited

U.S. PATENT DOCUMENTS

| | | | | |
|---|---|---|---|---|
| 3,397,001 A | * | 8/1968 | Friedman ............ | E05B 65/0014 292/128 |
| 4,416,477 A | * | 11/1983 | Bialobrzeski ....... | E05B 65/0014 292/19 |
| 4,542,924 A | * | 9/1985 | Brown .................... | E05C 19/06 292/87 |
| 5,711,554 A | * | 1/1998 | Brown ................ | E05B 65/0014 292/17 |

(Continued)

FOREIGN PATENT DOCUMENTS

| | | |
|---|---|---|
| JP | A-08-228811 | 9/1996 |
| JP | 2010-214026 A | 9/2010 |

(Continued)

OTHER PUBLICATIONS

Dec. 15, 2015 Office Action issued in Japanese Patent Application No. 2013-236413.

*Primary Examiner* — Victor MacArthur
(74) *Attorney, Agent, or Firm* — Oliff PLC

(57) ABSTRACT

An engaging mechanism includes an engaging member and an engaged member freely detachably engageable with the engaging member. The engaging member includes an engaging main part and an engaging claw part formed on the engaging main part, both resiliently deformable. The engaging claw part has an inwardly curved engaging surface defined by a first curvature continuous curve. The engaged member includes an engaged part engageable with the engaging claw part and having an outwardly curved engaged surface defined by a second curvature continuous curve. The engaging surface and the engaged surface contact each other at a linear contact area at a time from when the engaging claw part and the engaged part are in engagement with each other through to when the engaging claw part is disengaged from the engaged part. A curvature of the engaging surface (Continued)

at the linear contact area is smaller than a curvature of the engaged surface at the linear contact area.

6 Claims, 11 Drawing Sheets

(56) References Cited

U.S. PATENT DOCUMENTS

| | | | | |
|---|---|---|---|---|
| 5,975,593 | A * | 11/1999 | Cress | E05B 53/001 292/101 |
| 7,452,011 | B1 * | 11/2008 | Lind | E05C 17/36 292/298 |
| 2008/0030111 | A1 * | 2/2008 | Liu | A47B 88/0477 312/221 |

FOREIGN PATENT DOCUMENTS

| | | |
|---|---|---|
| JP | 2011-224323 A | 11/2011 |
| JP | A-2013-236760 | 11/2013 |
| WO | WO 2013/172329 A1 | 11/2013 |

* cited by examiner

FIG. 1
Related Art
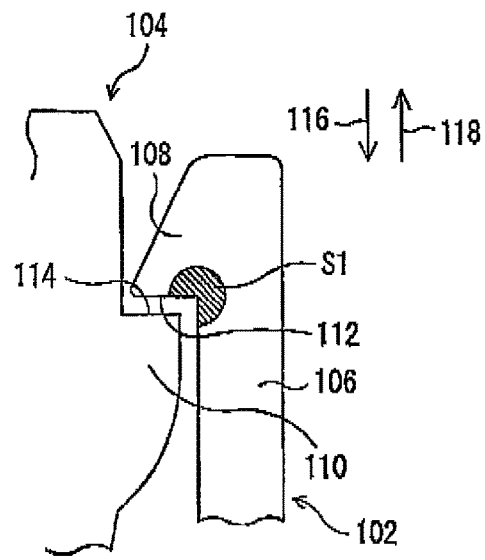
FIG.2(a)  FIG.2(b)  FIG.2(c)
Related Art  Related Art  Related Art
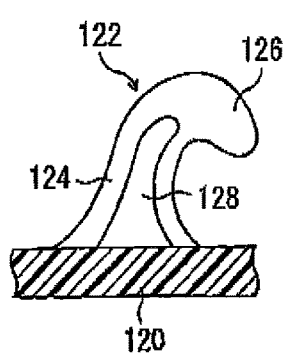 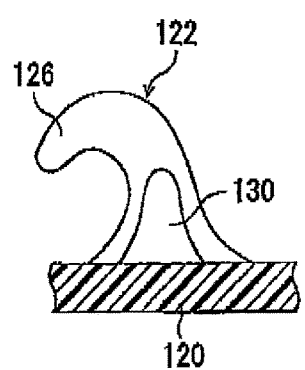 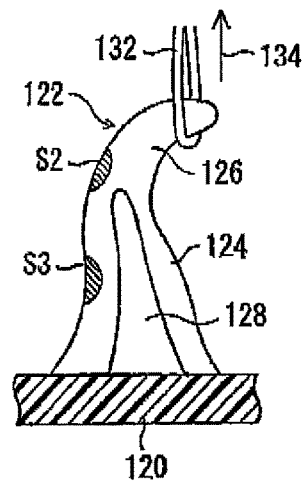

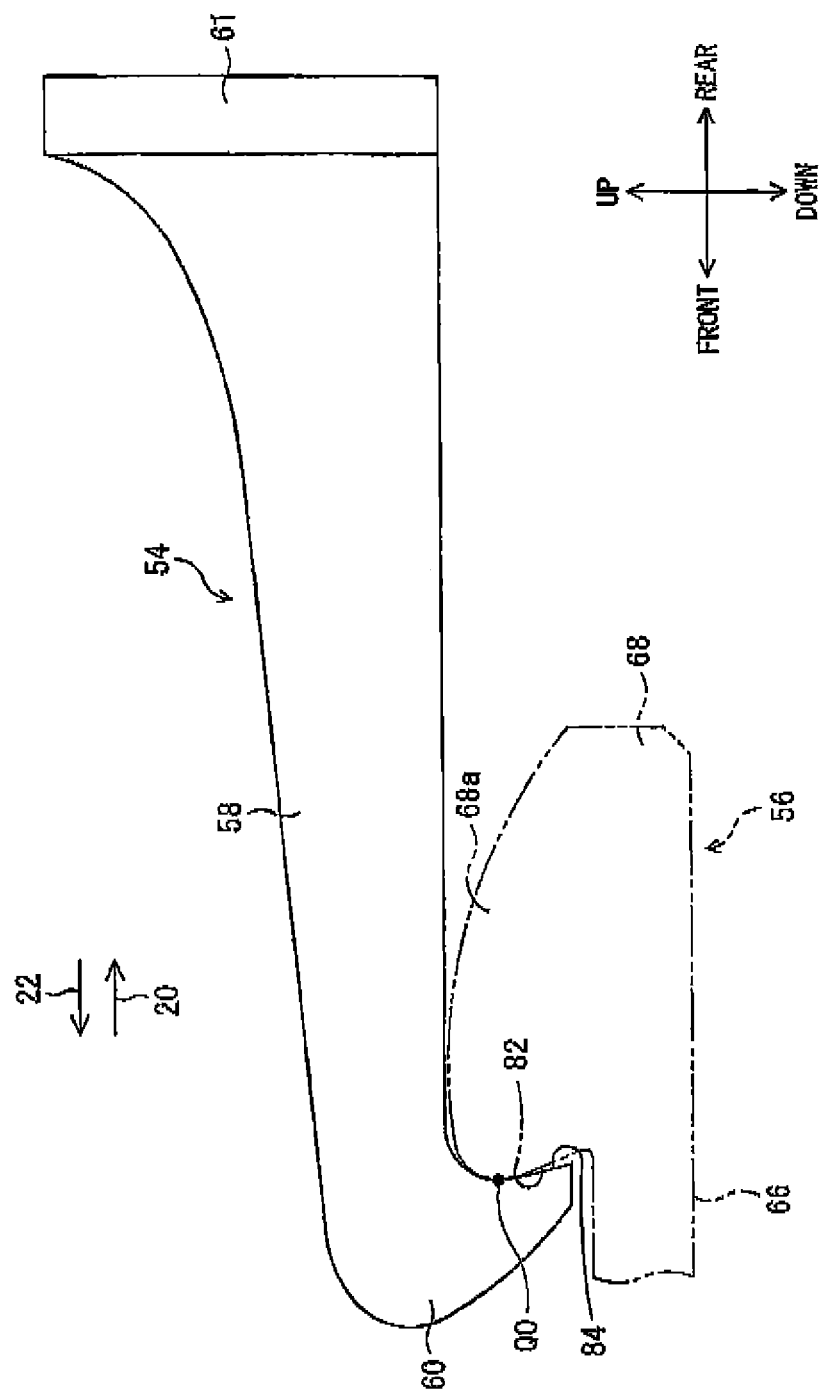

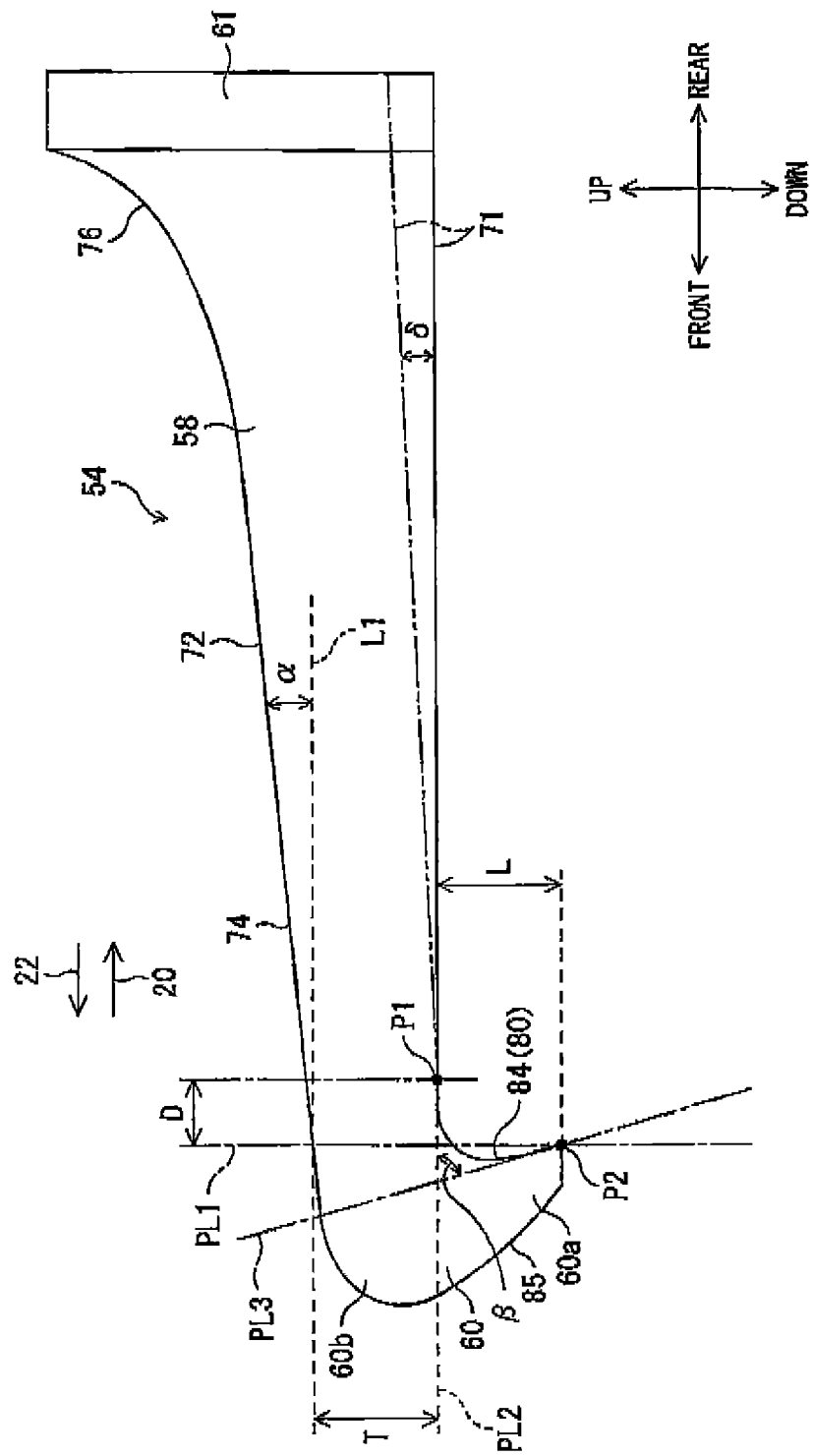

ENGAGING MECHANISM

BACKGROUND

1. Technical Field

The present invention relates to an engaging mechanism for freely detachably engaging two members with each other.

2. Related Art

An engaging mechanism is used for freely detachably engaging two members with each other. FIG. 1 shows an example of widely-used conventional engaging mechanisms. The engaging mechanism shown in FIG. 1 includes an engaging member 102 provided to a first member and an engaged member 104 provided to a second member. The engaging member 102 has an engaging main part 106 and an engaging claw part 108 formed on the engaging main part 106. The engaged member 104 is formed with an engaged part 110 that the engaging claw part 108 engages. The engaging claw part 108 has a planar engaging surface 112 that extends perpendicular to the engaging main part 106. Also, the engaged part 110 has a planar engaged surface 114 that extends parallel to and confronts the engaging surface 112.

The engaging member 102 is moved in a direction indicated by an arrow 116 or 118 relative to the engaged member 104, for example. When the engaging member 102 is moved in the direction indicated by the arrow 118, then the engaging claw part 108 of the engaging member 102 passes over the engaged part 110 of the engaged member 104, and then the engaging surface 112 of the engaging claw part 108 engages the engaged surface 114 of the engaged part 110. In this engaging state, the engaging surface 112 is in surface-to-surface contact with the engaged surface 114. On the other hand, when the engaging member 102 is moved in the direction indicated by the arrow 116, the engaging main part 106 and the engaging claw part 108 of the engaging member 102 elastically deform rightward in FIG. 1, and the engaging claw part 108 is disengaged from the engaged part 110. As a result, the engaging state is released.

Japanese Patent-Application Publication No. HEI-8-228811 discloses a different type of engaging mechanism, which is used for fasteners and includes a hook-shaped piece 122 shown in FIGS. 2(a) to 2(c). The hook-shaped piece 122 is integrally formed on a base member 120 and has an upright part 124 extending upward from the base member 120 and a curved part 126 formed on an end of the upright part 124. A first reinforcing rib 128 and a second reinforcing rib 130 are formed at either side of the upright part 124. The first reinforcing rib 128 is formed higher than the second reinforcing rib 130. With this configuration, when a loop member 132 is moved in a direction indicated by an arrow 134, the hook-shaped piece 122 elastically deforms as shown in FIG. 2(c). As a result, the loop member 132 is disengaged from the curved part 126 of the hook-shaped piece 122.

SUMMARY

However, in the conventional engaging mechanism shown in FIG. 1, when the engaging claw part 108 is disengaged from the engaged part 110, stress concentration occurs at a boundary area S1 between the engaging main part 106 and the engaging claw part 108, so that repetition of engagement and disengagement easily cases damage to the engaging claw part 108.

On the other hand, in the conventional engaging mechanism having the hook-shaped piece 122 shown in FIGS. 2(a) to 2(b), when the loop member 132 is disengaged from the curved part 126 of the hook-shaped piece 122, stress concentration occurs on areas S2 and S3 of the look-shaped piece 122 near the ends of the first and second reinforcing ribs 128 and 130, respectively. That is, the stress is distributed to two places (two areas S2 and S3). However, there is still a danger that repetition of the engagement and disengagement cases damage to the curved part 126 of the hook-shaped piece 122.

In view of the foregoing, it is an object of the invention to provide an engaging mechanism highly resistant to destruction even if engagement and disengagement between an engaging member and an engaged member are repeated, by distributing stress generated when the engaging member is getting separated from engaged member.

It is another object of the invention to provide an engaging mechanism capable of nearly uniformly distributing stress over an entire engaging member when the engaging member is getting disengaged from an engaged member.

In order to attain the above and other objects, the invention provides an engaging mechanism including an engaging member provided to a first member and an engaged member provided to a second member. The engaging member and the engaged member are freely detachably engageable with each other when the first member is moved relative to the second member in a predetermined direction. The engaging member includes an engaging main part and an engaging claw part formed on an end of the engaging main part. The engaging main part and the engaging claw part are resiliently deformable, and the engaging claw part has an inwardly curved engaging surface defined by a first curvature continuous curve. The engaged member includes an engaged part engageable with the engaging claw part of the engaging member. The engaged part has an outwardly curved engaged surface defined by a second curvature continuous curve. The engaging surface of the engaging claw part and the engaged surface of the engaged part contact each other at a linear contact area from when the engaging claw part and the engaged part are in engagement with each other through to when the engaging claw part is disengaged from the engaged part. A curvature of the engaging surface at the linear contact area is smaller than another curvature of the engaged surface at the linear contact area.

According to the engaging mechanism of the invention, because the engaging main part and the engaging claw part are resiliently deformable, and the engaging claw part and the engaged claw part have an inwardly curved engaging surface defined by a first curvature continuous curve and an outwardly curved engaged surface defined by a second curvature continuous curve, respectively, such that the engaging surface of the engaging claw part and the engaged surface of the engaged part contact each other at a linear contact area from when the engaging claw part and the engaged part are in engagement with each other through to when the engaging claw part is disengaged from the engaged part, resilient deformation of the engaging member (that is, the engaging main part and the engaging claw part) distributes stress generated at the linear contact area over the entire engaging main part and the entire engaging claw part, thereby preventing local stress concentration on a certain region of the engaging member when the engaging claw part separates from the engaged member. This prevents damage to the engaging member due to stress concentration, and thus the engaging member can be used for an extended period of time.

Also, in the process of releasing the engagement between the engaging member and the engaged member, the linear contact area between the engaging member and the engaged member shifts along the engaging surface of the engaging claw part toward the free end of the engaging claw part. Because the engaging mechanism is configured such that, at thus shifting linear contact area, the curvature of the engaging surface of the engaging claw part is always smaller than the curvature of the engaged surface of the engaged part, the engaging surface only contacts the engaged surface at thus shifting linear contact area and does not contact nor abut the engaged surface at any area other than thus shifting linear contact area. This configuration allows the engaging member to stably and resiliently deform when the engaging claw part separates from the engaged member, also prevents occurrence of local stress concentration on a certain region of the engaging member (the engaging main part and the engaging claw part).

BRIEF DESCRIPTION OF THE DRAWINGS

The particular features and advantages of the invention as well as other objects will become apparent from the following description taken in connection with the accompanying drawings, in which:

FIG. 1 is an enlarged side view of a conventional engaging mechanism;

FIG. 2(a) is an enlarged one side view of an engaging member of another conventional mechanism;

FIG. 2(b) is an enlarged other side view of the engaging member of FIG. 2(a);

FIG. 2(c) is an enlarge one side view of the engaging member of FIG. 2(a) in a deformed state;

FIG. 5 is an enlarged side view of the engaging mechanism according to the embodiment of the invention;

FIG. 6 is an enlarged side view of an engaging member of the engaging mechanism of FIG. 5;

DETAILED DESCRIPTION

Figure 3:
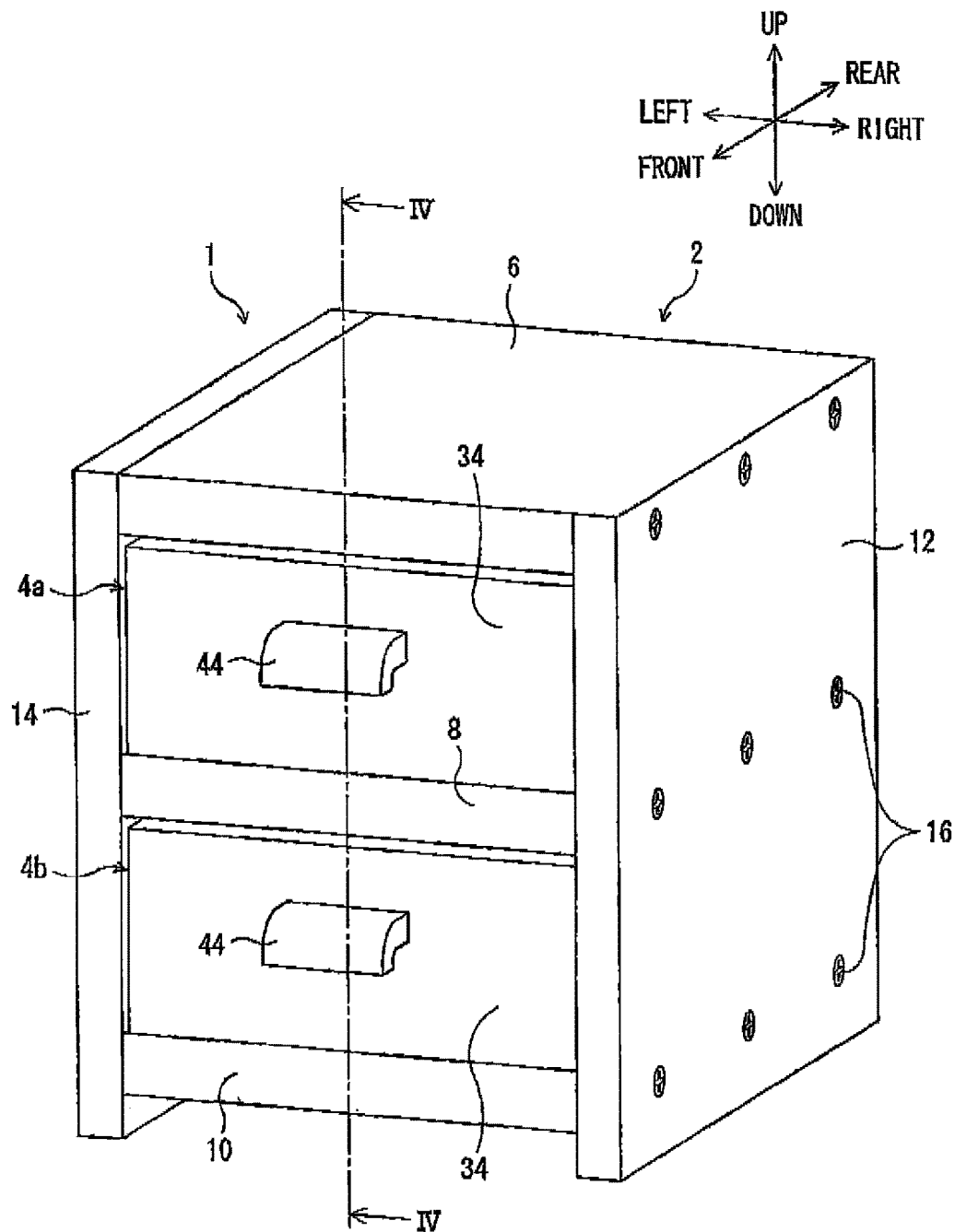
FIG. 3 is a perspective view of a storage box with an engaging mechanism according to an embodiment of the invention.

An engaging mechanism according to an embodiment of the invention will be described while referring to the accompanying drawings wherein like parts and components are designated by the same reference numerals to avoid duplicating description.

Before describing the engaging mechanism according to the embodiment, a storage box 1 utilizing the engaging mechanism will be described with reference to FIGS. 3 and 4. The storage box 1 has a box main body 2 and a pair of drawers 4a and 4b mounted one above the other in the box main body 2. The box main body 2 has an upper wall 6, a middle wall 8, a bottom wall 10, and a pair of side walls 12 and 14. The upper wall 6, the middle wall 8, and the bottom wall 10 are arranged in this order from the above to the bottom, and are disposed between and fixed to the pair of side walls 12 and 14 by, for example, fixing screws 16 (only those fixed to the right-side plate 12 are shown in FIG. 3).

The upper wall 6, the middle wall 8, and the pair of side walls 12 and 14 together define an upper accommodation space 18 for accommodating the upper drawer 4a. By pushing the drawer 4a in a closing direction indicated by an arrow 20 (hereinafter referred to as "direction 20"), a user can close the drawer 4a. That is, the drawer 4a is brought into a closed state where the drawer 4a is accommodated in the upper accommodation space 18 as shown in FIGS. 3 and 4. By pulling the drawer 4a in an opening direction indicated by an arrow 22 (hereinafter referred to as "direction 22"), on the other hand, the user can open the drawer 4a. That is, the drawer 4a is brought into an open state (not shown). The user can remove the drawer 4a from the box main body 2 by pulling the drawer 4a further in the direction 22.

The middle wall 8, the bottom wall 10, and the pair of side walls 12 and 14 together define a lower accommodation space 24 for accommodating the lower drawer 4b. By pushing the drawer 4b in the direction 20, the user can close the drawer 4b, i.e., the drawer 4b is brought into a closed state where the drawer 4b is accommodated in the lower accommodation space 24 as shown in FIGS. 3 and 4. By pulling the drawer 4b in the direction 22, the user can open the drawer 4b, i.e., the drawer 4b is brought into an open state (not shown). The user can remove the drawer 4b from the box main body 2 by pulling the drawer 4b further in the direction 22.

A pair of rear walls 26 and 28 is disposed at the rear of the upper and lower accommodation spaces 18 and 24 so as to close the rear thereof. The middle wall 8 and the bottom wall 10 are provided with abutment pins 30 and 32, respectively, at the rear sections thereof on an inner side of the rear walls 26 and 28. The abutment pins 30 and 32 come into abutment with the drawers 4a and 4b, thereby preventing the drawers 4a and 4b from moving rearward beyond the closed state. It should be noted that the upper wall 6, the middle wall 8, the bottom wall 10, the pair of side walls 12 and 14, and the rear walls 26 and 28 may be formed of wood, plywood, plastic, or the like, for example.

The drawers 4a and 4b will be described in detail. Because the drawers 4a and 4b have substantially the same configuration, only the upper drawer 4a (the lower drawer 4b) will be described below. The drawer 4a (4b) is formed in a box shape with an open top and has a front wall 34, a rear wall 36, a pair of sidewalls 38 (only one is shown in FIG. 4) that connects both ends of the front wall 34 and the rear wall 36, and a bottom wall 40 attached to the bottom sides of the front wall 34, the rear wall 36, and the pair of sidewalls 38. The front wall 34, the rear wall 36, the sidewalls 38, and the bottom wall 40 together define an open-top accommodation space 42 for accommodating various goods or objects (not shown). The front wall 34 of the drawer 4a (4b) is formed with a handle 44 on a front surface thereof. The user can close the drawer 4a (4b) by gripping and pressing the handle 44 in the direction 20 and open the drawer 4a (4b) (or remove the drawer 4a (4b) from the box main body 2) by gripping and pulling the handle 44 in the direction 22.

The storage box 1 is provided with engaging mechanisms 52a and 52b according to the embodiment of the invention in relation to the drawers 4a and 4b, respectively. Because the engaging mechanisms 52a and 52b have substantially the same configuration, only the engaging mechanism 52a (52b) will be described below. As shown in FIG. 4, the engaging mechanism 52a (52b) includes an engaging member 54 and an engaged member 56 that are freely detachably engaged with each other. In this embodiment, the engaging member 54 is provided to the box main body 2 (first member), and the engaged member 56 is provided to the drawer 4a (4b) (second member).

Figure 4:
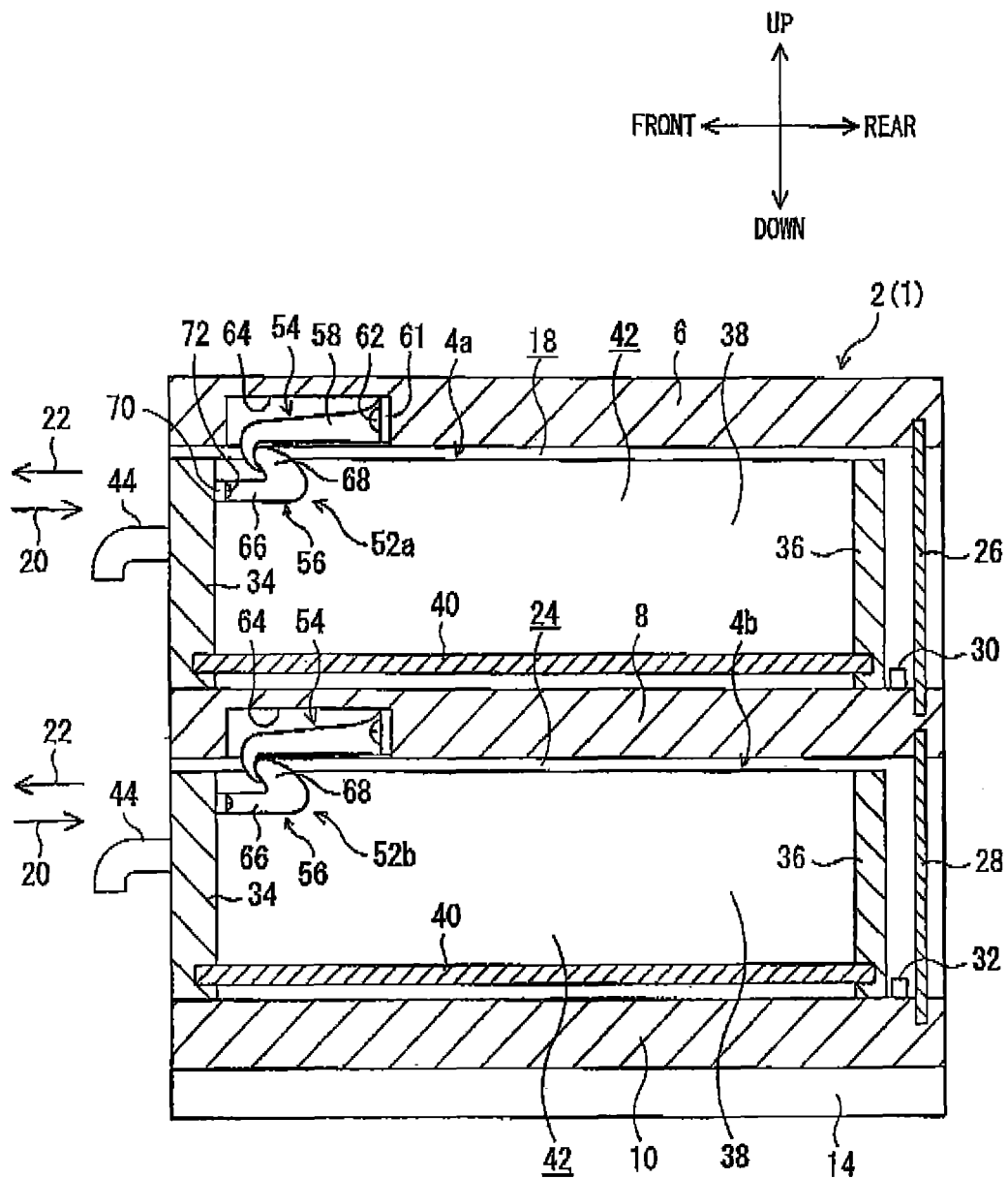
FIG. 4 is a cross-sectional view taken along a line IV-IV of FIG. 3.

With reference to FIGS. 4 to 6, the engaging member 54 has an engaging main part 58 extending in the front-rear direction, an engaging claw part 60 formed on a front end of the engaging main part 58, and a pair of attachment members 61 (only one attachment member 61 is shown) each protruding either rightward or leftward from a rear section of the engaging main part 58. The engaging claw part 60 has a protrusion 60a protruding downward toward the engaged member 56. The attachment members 61 are attached to the upper wall 6 (the middle wall 8) by attaching screws 62. In this embodiment, the upper wall 6 (the middle wall 8) is formed with a recess 64 in a bottom surface thereof, and the attachment members 61 of the engaging member 54 are attached to a rear surface of the recess 64 such that the engaging member 54 is located within the recess 64, except that the protrusion 60a protrudes outside the recess 64 into the upper accommodation space 18 (the lower accommodation space 24).

The engaged member 56 has an engaged main part 66 extending in the front-rear direction, an engaged part 68 formed on a rear end of the engaged main part 66, and a pair of attachment members 70 (only one attachment member 70 is shown) each protruding either rightward or leftward from a front section of the engaged main part 66. The engaged part 68 has a protrusion 68a protruding upward toward the engaging member 54. The attachment members 70 are attached to an inner surface of the front wall 34 of the drawer 4a (4b) by attaching screws 72.

The engaging member 54 will be described in greater detail. The engaging member 54 is made of such synthetic resin as ABS resin, nylon resin, or PEEK resin, for example, so as to be resiliently deformable.

As shown in FIG. 6, the engaging main part 58 of the engaging member 54 has an inner surface (lower surface) 71 and an outer surface (upper surface) 72. The inner surface 71 extends linearly from a front end P1 through to a rear end and parallel to a relative moving direction in which the engaging member 54 moves relative to the engaged member 56 (i.e., the directions 20 and 22). The outer surface 72 has a first part 74 at the front side and a second part 76 at the rear side. The first part 74 and the second part 76 extend substantially continuously from each other. The first part 74 extends linearly in a direction slanting outward (upward) toward the rear at an angle $\alpha$ with respect to an axis line L1 parallel to the relative moving direction. The angle $\alpha$ is preferably equal to or greater than 1.5 degrees and equal to or less than 8 degrees ($1.5° \leq \alpha \leq 8°$). When the angle $\alpha$ is set larger, then strength of the front part of the engaging main part 58 becomes relatively weaker. On the other hand, when the angle $\alpha$ is set smaller, then strength of the rear part of the engaging main part 58 becomes relatively weaker. The second part 76 extends from the first part 74 toward the rear and curves inward, and it is preferable that the second part 76 extend in a curvature continuous curve (third curvature continuous curve). Note that the curvature continuous curve indicates a curve with a curvature that continuously changes. By forming the engaging main part 58 in this shape, it is possible to nearly uniformly distribute the stress over the entire length of the engaging main part 58 in the front-rear direction when the engaging claw part 60 is disengaged from the engaged member 56, preventing occurrence of local stress concentration.

The engaging claw part 60 is integrally formed on the front end of the engaging main part 58. The engaging claw part 60 has a base part 60b formed continuous with the engaging main part 58 and the above-mentioned protrusion 60a. The protrusion 60a protrudes inward (downward) beyond the inner surface 71 of the engaging main part 58, and has an inwardly curved inner (rear) surface serving as an engaging surface 84 defined by a curvature continuous curve (first curvature continuous curve) between the front end P1 of the inner surface 71 (upper end P1 of the engaging surface 84) and a free end P2 of the protrusion 60a of the engaging claw part 60 (lower end P2 of the engaging surface 84). The upper end P1 of the engaging surface 84 is located a distance D to the rear of the lower end P2 in the relative moving direction. That is, the distance D indicates a distance between the upper end P1 and the lower end P2 in the relative moving direction.

Here, a first reference plane (another reference plane) PL1 shown in FIG. 6 indicates a plane that is perpendicular to the relative moving direction and that passes through the lower end P2 of the engaging surface 84. A second reference plane (reference plane) PL2 shown in FIG. 6 indicates a plane that is perpendicular to the first reference plane PL1 and that passes through the upper end P1 of the engaging surface 84. The engaging claw part 60 is formed such that a tangent plane PL3 to the engaging surface 84 that extends through the lower end P2 of the engaging surface 84 has an angle $\beta$ with respect to the second reference plane PL2. The angle $\beta$ is preferably equal to or greater than 60 degrees and less than 90 degrees ($60° \leq \beta < 90°$), and more preferably equal to or greater than 65 degrees and equal to or less than 80 degrees ($65° \leq \beta \leq 80°$). When the angle $\beta$ is set larger, then a curve 80 of the protrusion 60a of the engaging claw part 60 becomes shallower, making it easier to release the engagement between the engaging member 54 and the engaged member 56. On the other hand, when the angle $\beta$ is set smaller, then the curve 80 of the protrusion 60a of the engaging claw part 60 becomes deeper, making it more difficult to release the engagement and increasing risk of damaging the engaging member 54 when releasing the engagement.

Also, the engaging claw part 60 is formed such that the inner surface 71 of the engaging main part 58 matches a tangent plane to the engaging surface 84 passing through the upper end P1. That is, the inner surface 71 of the engaging main part 58 locates in the tangent plane to the engaging surface 84 that passes through the upper end P1 of the engaging surface 84. With this configuration, the upper end P1 of the engaging surface 84 of the engaging claw part 60 smoothly connects to the inner surface 71, preventing occurrence of stress concentration on a region surrounding the upper end P1 of the engaging surface 84.

In the first reference plane PL1, a distance L between the lower end P2 of the engaging surface 84 and the second reference plane PL2, i.e., a protrusion length L of the engaging claw part 60 (length of the protrusion 60a in the up-down direction), is preferably 0.3 to 1.1 times a distance T between the outer surface of the engaging member 54 and the second reference plane PL2 ($0.3T \leq L \leq 1.2T$) and more preferably 0.5 to 1.0 times the distance T ($0.5T \leq L \leq 1.0T$). When the protrusion length L of the engaging claw part 60 is set too smaller than the distance T, then the engaging claw part 60 becomes too small to resiliently deform when getting disengaged from the engaged member 56, increasing risk of damaging the engaging claw part 60. On the other hand, when the protrusion length L of the engaging claw part 60 is set too larger than the distance T, then the engaging claw part 60 excessively resiliently deforms, enabling the engaging member 54 and the engaged member 56 to only loosely engage each other. Thus, the engaging member 54 gets undesirably easily disengaged from the engaged member 56, and insufficiently tight engagement is only obtained between the engaging member 54 and the engaged member 56.

Also, the distance D between the upper end P1 and the lower end P2 in the relative moving direction is preferably 0.1 to 1.0 times the distance T ($0.1T \leq D \leq 1.0T$), and more preferably 0.3 to 0.7 times the distance T ($0.3T \leq D \leq 0.7T$).

As shown in FIG. 5, the engaged part 68 of the engaged member 56 has an outwardly curving inner surface (front surface) serving as an engaged surface 82 that engages (contacts) the engaging surface 84 of the engaging claw part 60. The engaged surface 82 forms a curvature continuous curve (second curvature continuous curve).

Figure 7A:
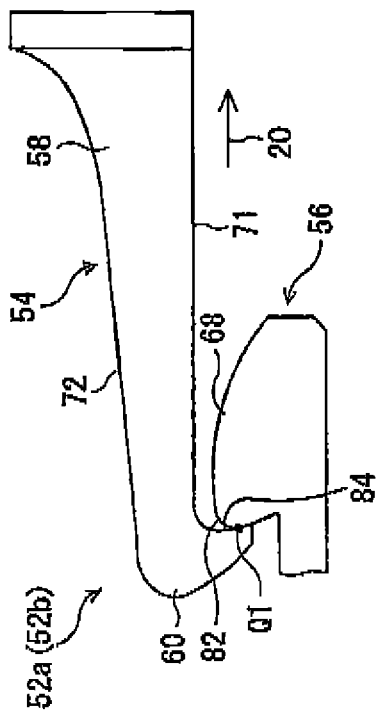
FIG. 7(a) is a side view of the engaging mechanism of FIG. 5 in an engaging state where the engaging member is in engagement with an engaged member.

As shown in FIGS. 5 and FIGS. 7(a) to 7(d), the engaging surface 84 and the engaged surface 82 are configured such that the engaging surface 84 and the engaged surface 82 only contact each other at a linear contact area, from when the engaging claw part 60 and the engaged part 68 are in engagement with each other as shown in FIGS. 5 and 7(a) through to when the engagement is released after the engaging member 54 is moved relative to the engaged member 56 in the direction 20 shown in FIG. 7(a) (the engaged member 56 is moved in the direction 22 shown in FIG. 5 in this embodiment), i.e., from the time that the engaging surface 84 and the engaged surface 82 come into contact with each other through to when the engaging surface 84 separates from the engaged surface 82.

More specifically, in the course of releasing the engagement between the engaging claw part 60 and the engaged part 68, the linear contact area between the engaging surface 84 and the engaged surface 82 shifts along the engaging surface 84 toward the lower end P2 from a linear contact area Q0 through linear contact areas Q1 and Q2 to a linear contact area Q3 (see FIGS. 7(a) to 7(d)). The engaging surface 84 and the engaged surface 82 are configured such that, at thus shifting linear contact area, a curvature of the engaging surface 84 is always smaller than that of the engaged surface 82. With this configuration, the engaging surface 84 and the engaged surface 82 do not contact or come into abutment with each other at any points or sections other than thus shifting linear contact area. This enables the engaging member 54 to stably resiliently deform when the engaging claw part 60 disengages from the engaging member 54, thereby preventing occurrence of local stress concentration on a certain region of the engaging member 54.

It should be noted that the linear contact area has a width and extends straight in the right-left direction which is perpendicular to the sheet surface of FIG. 5 because the engaging surface 84 and the engaged surface 82 have widths in the right-left direction. In other words, the engaging surface 84 contacts the engaged surface 82 only at a single point with respect to a direction following the curvature continuous curve of the engaging surface 84.

The engaging claw part 60 of the engaging member 54 also has an outer surface (front surface) 85 that protrudes outward in an arc and extends from the lower end P2 of the engaging surface 84 (the free end P2 of the engaging claw part 60) to the front end of the outer surface 72 of the engaging main part 58. In other words, the free end P2 of the engaging claw part 60 indicates intersection between the engaging surface 84 and the outer surface 85 in this embodiment. A thickness of the protrusion 60a of the engaging claw part 60 in the front-rear direction (i.e., a distance between the engaging surface 84 and the outer surface 85) is set greater toward the base part 60b of the engaging claw part 60. This configuration nearly uniformly distributes stress over the entire protrusion 60a when the engaging claw part 60 is disengaged from the engaged part 68. Note that the outer surface 85 of the engaging claw part 60 and the outer surface 72 of the engaging main part 58 together form the outer surface of the engaging member 54.

In this engaging mechanism 52a (52b), engagement between the engaging member 54 and the engaged member 56 is released in the following manner. With reference to FIGS. 5 and FIGS. 7(a) to 7(d), when the drawer 4a (4b) is in the closed state, the engaging member 54 and the engaged member 56 are maintained in the engaging state shown in FIGS. 5 and 7(a). In this engaging state, the engaging surface 84 of the engaging claw part 60 of the engaging member 54 and the engaged surface 82 of the engaged member 56 contact each other at the linear contact area Q0.

Figure 7B:
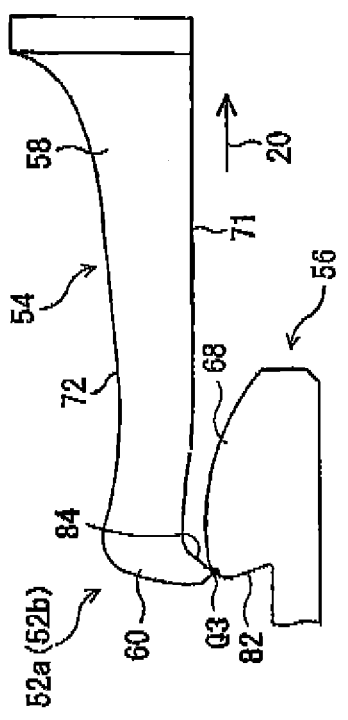
FIG. 7(b) is a side view of the engaging mechanism with the engaging member moved in a direction away from the engaged member from the position shown in FIG. 7(a)

When the drawer 4a (4b) is pulled in the direction 22, then the engaging member 54 moves relative to the engaged member 56 in the direction 20. As a result, as shown in FIG. 7(b), the engaging claw part 60 and a front section of the engaging main part 58 of the engaging member 54 slightly resiliently deform. Also, the linear contact area between the engaging surface 84 and the engaged surface 82 slightly shifts toward the lower end P2 along the engaging surface 84 from the linear contact area Q0 to the linear contact area Q1. As described above, at the linear contact area Q1 also, the curvature of the curvature continuous curve of the engaging surface 84 is smaller than that of the engaged surface 82. Thus, in this state, the engaging surface 84 and the engaged surface 82 do not contact each other at any area other than the linear contact area Q1.

Figure 7C:
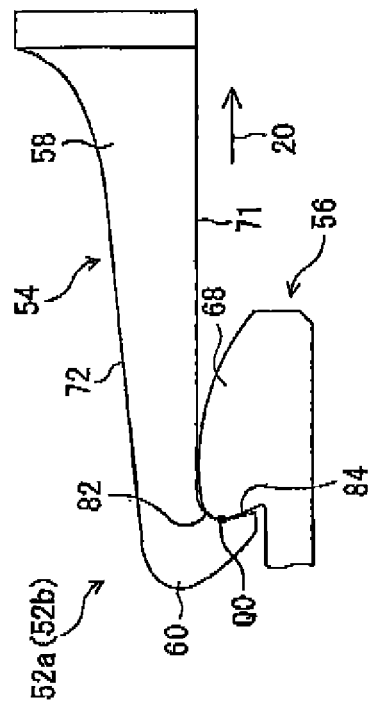
FIG. 7(c) is a side view of the engaging mechanism with the engaging member moved in the direction away from the engaged member from the position shown in FIG. 7(b)

When the drawer 4a (4b) is pulled further in the direction 22 thereafter, then the state of the engaging mechanism 52a (52b) shifts from that shown in FIG. 7(b) to that shown in FIG. 7(c). In the state shown in FIG. 7(c), the engaging main part 58 and the engaging claw part 60 of the engaging member 54 greatly resiliently deform, and the engaging surface 84 of the engaging member 54 and the engaged surface 82 of the engaged member 56 contact each other at the linear contact area Q2. When the drawer 4a (4b) is pulled even further in the direction 22 thereafter, then the state of the engaging mechanism 52a (52b) shifts to that shown in FIG. 7(d). In the state shown in FIG. 7(d), the engaging main part 58 and the engaging claw part 60 of the engaging member 54 greatly resiliently deform even further to bend backwards, and the engaging surface 84 of the engaging member 54 and the engaged surface 82 of the engaged member 56 contact each other at the linear contact area Q3. When the drawer 4a (4b) is pulled further, then the engagement between the engaging claw part 60 and the engaged part 68 is completely released, and the engaging claw part 60 is separated from the engaged part 68.

As described above, as in the linear contact areas Q0 and Q1, the engaging surface 84 of the engaging claw part 60 and the engaged surface 82 of the engaged part 68 only contact each other at the linear contact area Q2 (Q3). At the linear contact area Q2 (Q3) also, the curvature of the curvature continuous curve of the engaging surface 84 is smaller than that of the engaged surface 82, and thus the engaging surface 84 and the engaged surface 82 do not contact each other at any area other than the linear contact area Q2 (Q3) in this state.

That is, when the drawer 4a (4b) is pulled in the direction 22, then the engaging member 54 of the engaging mechanism 52a (52b) resiliently deforms as described above, and the engaging surface 84 of the engaging claw part 60 and the engaged surface 82 of the engaged part 68 only contact each other at one linear contact area at a time. Thus, stress that occurs when disengaging the engaging member 54 from the engaged member 56 is distributed over the entire engaging member 54, and thus local stress concentration on a certain region can be avoided. This prevents damage to the engaging member 54, more particularly to the engaging claw part 60, even if engagement and disengagement are repeated.

Figure 7D:
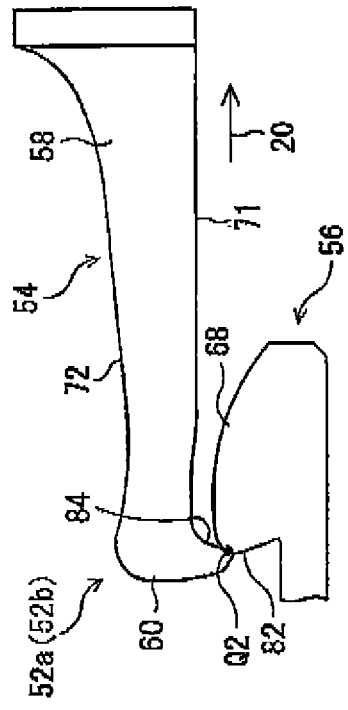
FIG. 7(d) is a side view of the engaging mechanism with the engaging member moved in the direction away from the engaged member from the position shown in FIG. 7(c)

Contrary to the above, when the drawer 4a (4b) in the open state is pushed in the direction 20, first the engaged part 68 of the engaged member 56 greatly resiliently deforms the engaging member 54, and then as shown in FIG. 7(d) the engaged part 68 of the engaged member 56 engages an end section of the engaging claw part 60 of the engaging member 54. When the drawer 4a (4b) is pushed to the closed state thereafter, then the state of the engaging mechanism 52a (52b) shifts through that shown in FIGS. 7(c) and 7(b) to the state shown in FIG. 7(a). As a result, the engaging surface 84 of the engaging claw part 60 engages (contacts) the engaged surface 82 of the engaged part 68.

Figure 8:
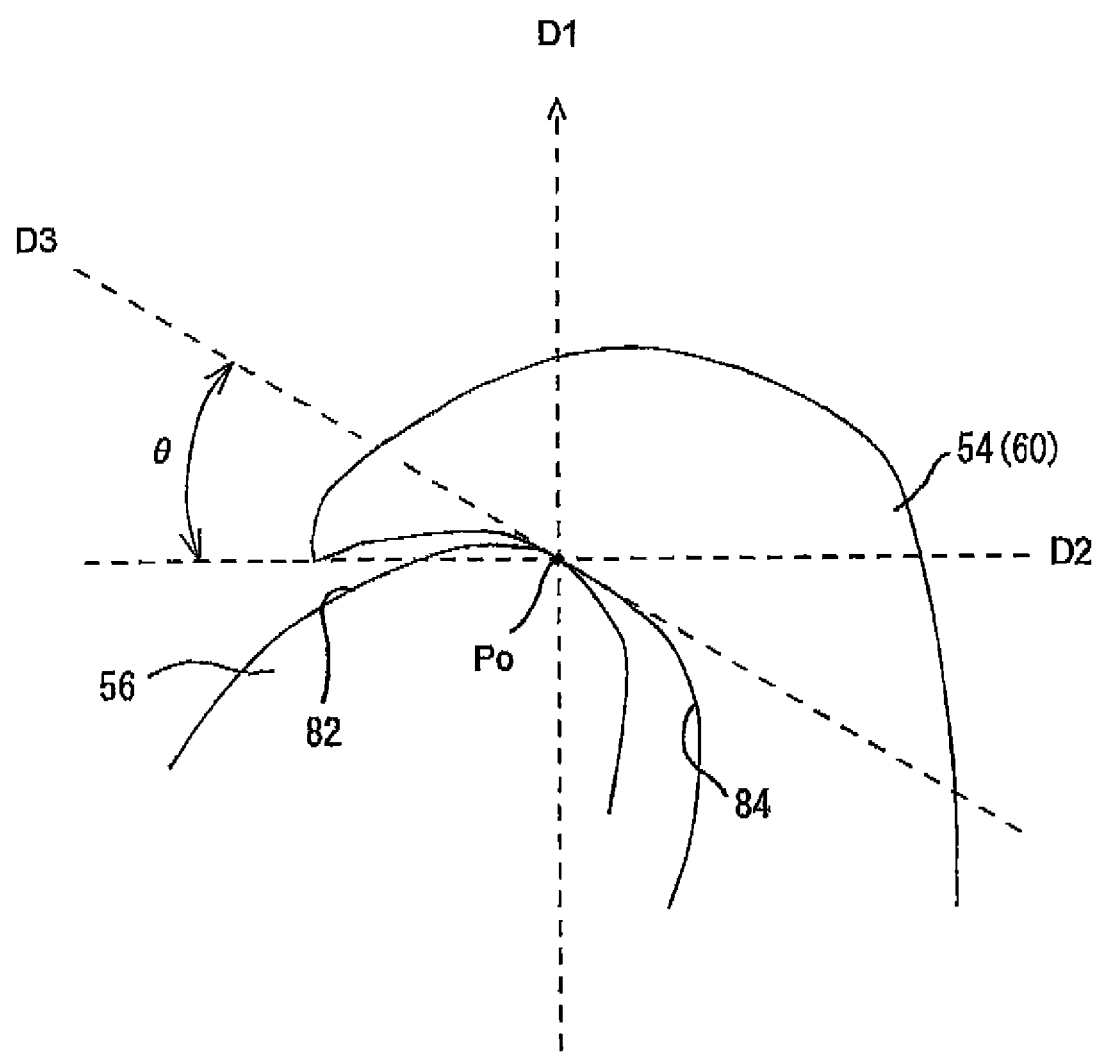
FIG. 8 is an explanatory side view of relevant parts of the engaging member and the engaged member in modified shapes for explaining principle of the engaging mechanism.

Next, a principle for engagement and disengagement in the engaging mechanism 52a (52b) will be explained with reference to FIG. 8. Note that FIG. 8 shows the engaging member 54 and the engaged member 56 but in modified shapes in order to facilitate the explanation of the principle. In FIG. 8, a direction D1 indicates the relative moving direction (i.e., a direction parallel to the directions 20 and 22), and a line D2 extends perpendicular to the direction D1 and passes through a contact point Po between the engaging surface 84 and the engaged surface 82. A line D3 is a tangent to the engaging surface 84 passing through the contact point Po.

The engaged member 56 does not slide along the engaging surface 84 but stays still when the following equation is satisfied:

$$\theta = \tan^{-1} \mu$$

wherein: μ is a friction coefficient between the engaging member 54 and the engaged member 56; and θ is an angle of the line D3 with respect to the line D2.

However, when greater stress is generated, then the angle θ becomes greater than $\tan^{-1} \mu$ ($\theta > \tan^{-1} \mu$). In this case, the engaging member 54 slides on the engaged surface 82 rightward in FIG. 8, getting disengaged from the engaged member 56. On the other hand, when less stress is generated, then the angle θ becomes smaller than $\tan^{-1} \mu$ ($\theta < \tan^{-1} \mu$). In this case, the engaging member 54 slides on the engaged surface 82 leftward in FIG. 8, so as to be more deeply engaged with the engaged member 56.

Also, the limit of deformation of the engaging main part 58 and the engaging claw part 60 (deforming amount by which the engaging maim part 58 and the engaging claw part 60 can deform without being damaged) is set greater than the deforming amount of the engaging main part 58 and the engaging claw part 60 at the time of when the equation $\theta = \tan^{-1} \mu$ is satisfied.

While the invention has been described in detail with reference to the embodiment thereof, it would be apparent to those skilled in the art that various changes and modifications may be made therein without departing from the spirit of the invention.

For example, in the above-described embodiment, the inner surface 71 of the engaging main part 58 extends parallel to the relative moving direction. However, the inner surface 71 of the engaging main part 58 may be angled with respect to the relative moving direction so as to extend toward the outer surface 76 and toward the rear side, as indicated by a chain line in FIG. 6. In this case, an angle δ between the inner surface 71 and the relative moving direction is preferably no greater than 5 degrees, and more preferably no greater than 3 degrees. In other words, the inner surface 71 preferably extends at the angle δ between 0 degree and 5 degrees, and more preferably between 0 degree and 3 degrees, with respect to the relative moving direction.

Figure 9:
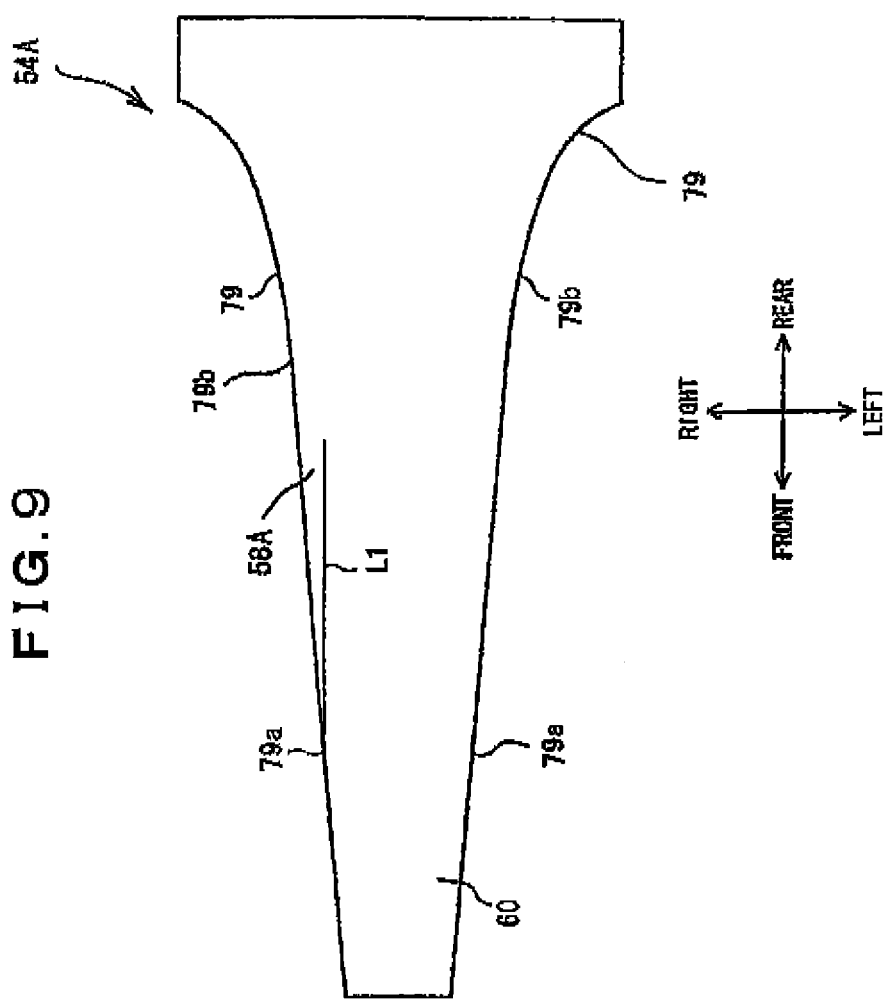
FIG. 9 is a plan view of an engaging member according to a modification of the embodiment of the invention.

In the above-described embodiment, the engaging main part 58 is formed to have a greater thickness toward the rear as shown in FIGS. 5 and 6. However, an engaging main part having a uniform thickness in the entire length may be used. In this case, however, the engaging main part preferably has a greater width toward the rear. More specifically, FIG. 9 shows an engaging member 54A having such an engaging main part 58A. That is, the engaging main part 58A has a uniform thickness in the up-down direction in the entire length, and has right and left surfaces (first and second side surfaces) 79, 79, each having a first part 79a on the front side and a second part 79b on the rear side. The first part 79a extends linearly and outwardly toward the rear at a predetermined angle with respect to the relative moving direction (the axis line L1). The second part 79b extends from the first part 79a toward the rear side in an inwardly curves shape defined by a curvature continuous curve (this curvature continuous curve). The above-described effects can be obtained with this engaging member 54A also.

The above-described engaging mechanism 52a, 52b can be used in various apparatus, tools, devices, and the like. For example, the engaging mechanism 52a, 52b can be used as an engaging mechanism in containers with an openable lid, such as a container 90 shown in FIG. 10, as an attaching mechanism in tools, as a holding mechanism for keep doors open, as an attaching mechanism of lampshades, as a connecting mechanism for sprinkling hoses, an attaching mechanism for attaching a casing to another casing, and the like.

Figure 10:
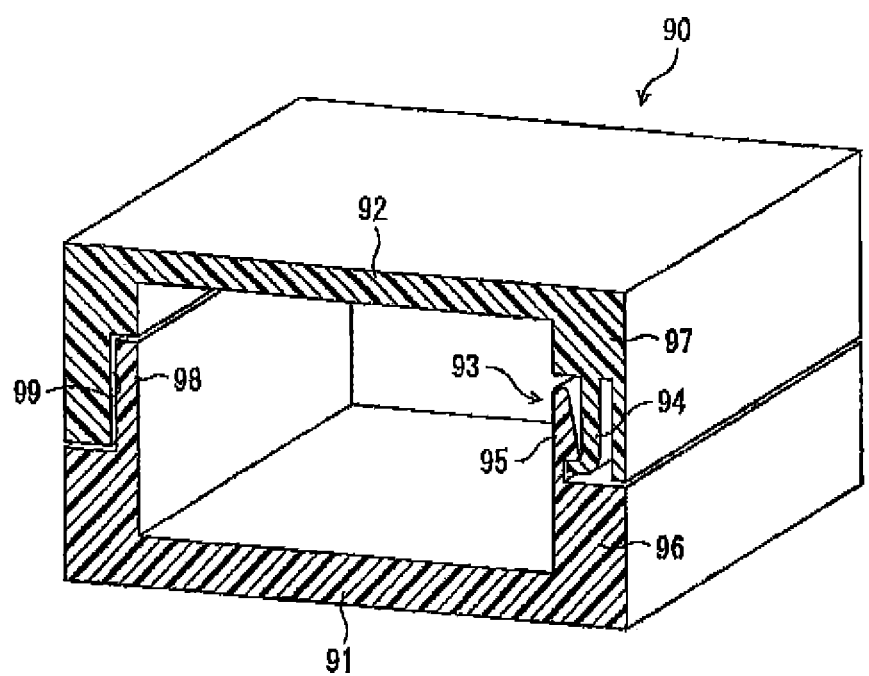
FIG. 10 is a perspective view of a container with the engaging mechanism according to the embodiment of the invention shown in FIG. 5.

The container 90 shown in FIG. 10 will be described next as an example of such apparatus. As shown in FIG. 10, the container 90 has an open-top main body 91 and a lid 92 for opening and closing the open top of the main body 91. In this example, an engaging mechanism 93 is provided inside the container 90. More specifically, the engaging mechanism 93 includes an engaging member 94 and an engaged member 95 having the same configuration as the engaging member 54 and the engaged member 56 of the above-described engaging mechanism 52a, 52b. The engaged member 95 is formed integrally with a side wall 96 of the main body 91, and the engaging member 94 is formed integrally with a side wall 97 of the lid 92.

The main body 91 is formed with a guide 98 that protrudes upward from top edges of its side walls except where the engaged member 95 is positioned, and, in corresponding to the guide 98, the lid 92 is formed with a recess 99 in bottom edges of its side walls except where the engaging member 94 is positioned. The guide 98 and the recess 99 together enable the lid 92 to move relative to the main body 91 in a predetermined direction (up-down direction in this example).

In order to mount the lid 92 on the main body 91, the lid 92 is placed over the main body 91 and lowered to a mounting position shown in FIG. 10 such that the recess 98 of the lid 92 slides along and receives the guide 98 of the main body 91. In this mounting process, the engaging member 94 on the lid 92 side once resiliently deforms outward and then engages the engaged member 95 on the main body 91 side. As a result, the lid 92 is freely detachably attached to the main body 91.

When the lid 92 is lifted upward relative to the main body 91, then the engaging member 94 on the lid 92 side resiliently deforms outward to release the engagement between the engaging member 94 and the engaged member 95, and the lid 92 is detached from the main body 91 to expose the open top of the main body 91.

Photoelastic Tests

Figure 11:
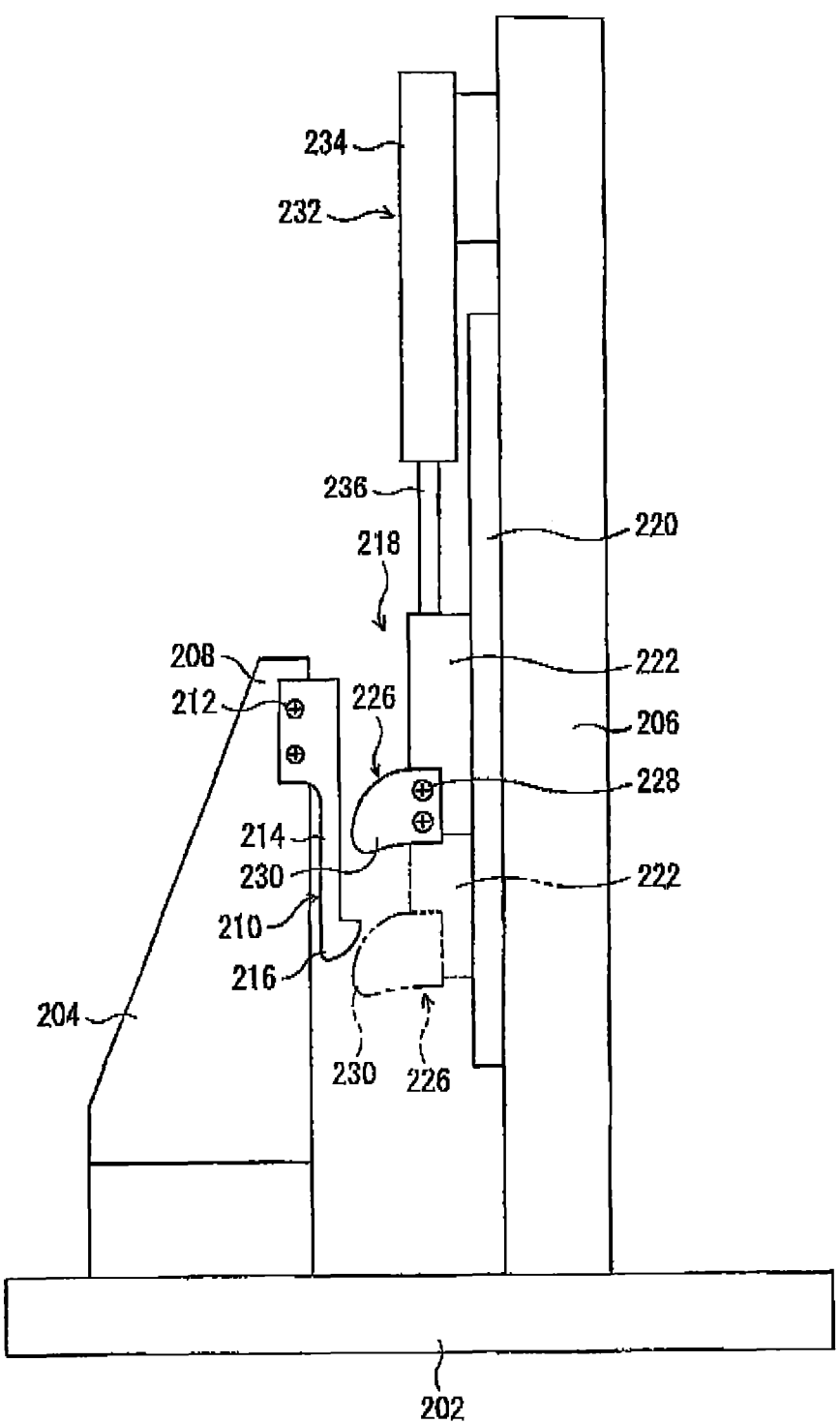
FIG. 11 is a simplified schematic side view of an experiment device used in photoelastic tests.

Following first to third photoelastic tests were conducted with an experiment device shown in FIG. 11 to confirm the effects of the engaging mechanism according to the embodiment of the invention (particularly the effects of the engaging member thereof). The experiment device shown in FIG. 11 includes a base member 202 to be placed on a floor, table, or the like, and an attaching member 204 and a column 206 fixed on the base member 202 next to each other. The attaching member 204 has an attaching part 208 at its free end. An engaging member 210 of an engaging mechanism to be tested is fixed to the attaching part 208 by fixing screws 212 such that an engaging main part 214 of the engaging member 210 extends vertically downward and that an engaging claw part 216 of the engaging member 210 protrudes toward the column 206.

The experiment device also includes a linear guide mechanism 218 and a pneumatic cylinder mechanism 232. The linear guide mechanism 218 has a stationary guide 220 attached to the column 206 and a sliding member 222 freely slidably supported on the stationary guide 220. An engaged member 226 of the engaging mechanism is fixed to the lower end of the sliding member 222 by fixing screws 228 such that an engaged part 230 of the engaged member 226 protrudes toward the engaging member 210. The pneumatic cylinder mechanism 232 has a cylinder 234 attached to the column 206 and an output rod 236 linked to the sliding member 222. When the output rod 236 is in a retracted position, the sliding member 222 is located at a lifted position shown in FIG. 11, and the engaged part 230 of the engaged member 226 is located at a position higher than the engaging claw part 216 of the engaging member 210. When the output rod 236 extends, the sliding member 222 slides downward along the stationary guide 220 to an operation position indicated by a dashed line in FIG. 11, and the engaged part 230 of the engaged member 226 passes over the engaging claw part 216 of the engaging member 210 and reaches a position lower than the engaging claw part 216.

The first photoelastic test was conducted on an engaging mechanism having the same configuration as the engaging mechanism 52a, 52b (the engaging member 54 and the engaged member 56) according to the above-described embodiment shown in FIGS. 4 and 5. Thus, in the following description, parts and components corresponding to those of the embodiment are designated by the same reference numerals.

Figure 12A:
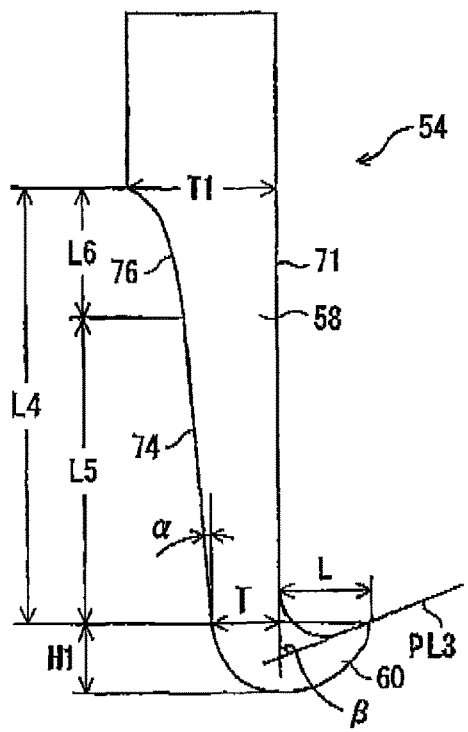
FIG. 12(a) is an enlarged side view of an engaging member having the configuration according to the embodiment of the invention subjected to a first photoelastic test.

The engaging member 54 used in this test has shape shown in FIG. 12(a), and table T1 shows specifics of the engaging member 54 and the engaged member 56.

TABLE T1

| | Engaging Main Part 58 is Formed Integral with Engaging Claw Part 60 | |
|---|---|---|
| | Material | Polypropylene |
| Engaging Member 54 | Length L4 in Longitudinal Direction | 18.5 mm |
| | Width | 5.0 mm |
| | Length L5 of First Part 74 of Outer Surface 72 | 12.0 mm |
| | Angle α of First Part 74 of Outer Surface 72 | 6.5 degrees |
| | Length L6 of Second part 76 | 6.5 mm |
| | Second Part 76 of Outer Surface 72 | curvature continuous curve |
| | Thickness T1 at Base End | 8.0 mm |
| | Thickness T at Free End | 2.6 mm |
| Engaging Claw Part 60 | Protrusion Length L | 2.6 mm |
| | Width | 5.0 mm |
| | Height H1 | 5.0 mm |
| | Angle β of Tangent Plane L3 | 78 degree |
| | Engaging Surface 84 | Curvature Continuous Curve |
| Engaged Member 56 | Material | Polyoxymethylene (POM) |
| | Engaged Surface 82 Contact with Engaging Surface 84 | Curvature Continuous Curve Linear Contact (Linear Contact Area Extends in Width Direction) |

The second photoelastic test was conducted on an engaging mechanism having the configuration of the conventional engaging mechanism having the engaging member 102 and the engaged member 104 shown in FIG. 1. In the following description, parts and components corresponding to those of the conventional engaging mechanism are designated by the same reference numerals.

Figure 12B:
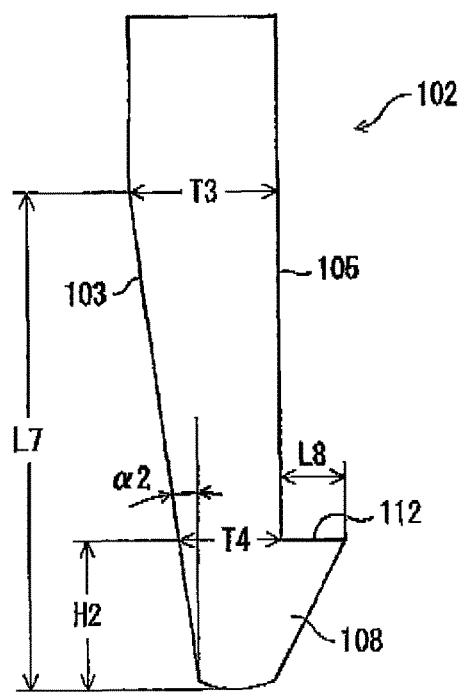
FIG. 12(b) is an enlarged side view of an engaging member having a conventional configuration subjected to a second photoelastic test.

The engaging member 102 used in this test has shape shown in FIG. 12(b), and table T2 shows specifics of the engaging member 102 and the engaged member 104.

TABLE T2

| | Engaging Main Part 106 is Formed Integral with Engaging Claw Part 108 | |
|---|---|---|
| | Material | Polypropylene |
| Engaging Member 102 | Length L7 in Longitudinal Direction | 18.5 mm |
| | Width | 5.0 mm |
| | Outer Surface 103 | Angled Flat Surface |
| | Angle α2 of Outer Surface 103 with respect to Inner Surface 105 | 6.5 degrees |
| | Thickness T3 at Base End | 8.0 mm |
| | Thickness T4 at Free End | 2.6 mm |

TABLE T2-continued

| | Engaging Main Part 106 is Formed Integral with Engaging Claw Part 108 | |
|---|---|---|
| | Material | Polypropylene |
| Engaging Claw Part 108 | Protrusion Length L8 | 2.6 mm |
| | Width | 5.0 mm |
| | Height H2 | 5.0 mm |
| | Engaging Surface 112 | Flat surface |
| Engaged Member 104 | Material | Polyoxymethylene (POM) |
| | Engaged Surface 114 | Flat Surface |
| | Contact with Engaging Surface 112 | Surface-to-Surface Contact |

In the first photoelastic test, the engaging member 54 was attached to the attaching member 204, and the engaged member 56 was attached to the sliding member 222. The pneumatic cylinder mechanism 232 was extended to lower the engaged part 68 of the engaged member 56 to a position lower than the engaging claw part 60 of the engaging member 54, and it was video recorded and examined.

Also, in the second photoelastic test, the engaging member 102 of the conventional engaging mechanism was attached to the attaching member 204, and the engaged member 104 of the same was attached to the sliding member 222. The second photoelastic test was conducted in the same manner as in the first photoelastic text, and it was video recorded and examined.

Through examination, it was discovered that stress generated when the engaged part 68 pressed against the engaging claw part 60 in the first photoelastic test was partially distributed to the engaging main part 58. Also, in the first photoelastic test, stress generated just before the engaged part 68 was separated from the engaging claw part 60 was transmitted and distributed from the engaging claw part 60 to the engaging main part 58, and the stress was applied nearly uniformly on the entire engaging member 54. Note that the engaging member 54 resiliently deformed by the greatest extent just before the engaged part 68 was separated from the engaging claw part 60, and the greatest stress was therefore applied on the engaging member 54 at that timing. In the second photoelastic test, on the other hand, both stress generated when the engaged part 110 pressed against the engaging claw part 108 and stress generated just before the engaged part 110 was separated from the engaging claw part 108 concentrated on the engaging claw part 108 and was hardly transmitted to the engaging main part 106.

The third photoelastic test was conducted in the same manner as the first and second photoelastic tests, with the engaging member 102 used in the second photoelastic test attached to the attaching member 204 of the experiment device and the engaged member 56 used in the first photoelastic test attached to the sliding member 222, and it was video recorded and examined.

It was observe that stress generated when the engaged part 68 pressed against the engaging claw part 108 was not transmitted to the engaging main part 106 in a well-balanced manner. Although stress generated just before the engaged part 68 was separated from the engaging claw part 108 was transmitted and distributed to the engaging main part 106, the stress was only distributed unevenly.

From the test results described above, it was confirmed that by adopting the configuration of the engaging mechanism 52a, 52b (especially the engaging member 54), it is possible to distribute stress from an engaging claw part to an engaging main part when an engaging member engages or disengages from an engaged member, and it is also possible to nearly evenly distribute relatively large stress over the entire engaging claw part and the entire engaging main part when the engaging member separates from the engaged member, thereby avoiding occurrence of local stress concentration.

Endurance Tests

Following first to eighth endurance tests of engaging mechanisms were also conducted with the same experiment device shown in FIG. 11 with the pneumatic cylinder mechanism 232 removed. In the endurance tests, an engaging member was attached to the attaching member 204 in the same manner as in the photoelastic tests, and the sliding member 222 of the linear guide mechanism 218 was repeatedly dropped from a position 80 to 90 cm higher than an engaging surface of an engaging member to a position lower than the engaging member so that an engaged part of an engaged member repeatedly hit against an engaging claw part of the engaging member, up to 50000 times until the engaging member was damaged.

Engaging members used in the first to fourth endurance tests had the same shape and specifics as the engaging member that was tested in the first photoelastic test, but were made of acryl resin, ABS resin, polycarbonate resin, and polypropylene resin, respectively. Engaged members used in the first to fourth endurance tests were all identical to the engaged member that was used in the first photoelastic test.

Also, engaging members used in the fifth to eighth endurance tests had the same shape and specifics as the engaging member that was used in the second photoelastic test, but were made of acryl resin, ABS resin, polycarbonate (PC) resin, and polypropylene (PP) resin, respectively. Engaged members used in the fifth to eighth endurance tests were all identical to the engaged member that was used in the second photoelastic test.

Table T3 shows results of the first to eighth endurance tests.

TABLE T3

| | | damage to engaging member (o: not damaged, x: damaged) | Number of repeating times | abrasion and stress whitening | material |
|---|---|---|---|---|---|
| embodiment | first test | x | 250 | | acryl |
| | second test | x | 1250 | | ABS |
| | third test | x | 3463 | | PC |
| | fourth test | o | 50000 | little | PP |
| conventional | fifth test | x | 1 | | acryl |
| | sixth test | x | 79 | | ABS |
| | seventh test | x | 545 | | PC |
| | eighth test | o | 50000 | significant | PP |

As will be understood from the test results shown in Table T3, the repeating times counted in the first to fourth tests were more than six to ten times as many as that in the corresponding fifth to eighth tests, and it was confirmed that adopting the configuration of the engaging mechanism (especially the engaging member) according to the embodiment of the invention significantly improves endurance of engaging mechanisms, making it possible to use the engaging mechanisms for an extended period of time.

Also, although significant abrasion and stress whitening were observed at the free end of the engaging claw part 108 and at the engaging main part 106, respectively, in the eighth test, abrasion and stress whitening were hardly observed at the free end of the engaging claw part 60 and the engaging main part 58, respectively, in the fourth test.

What is claimed is:

1. An engaging mechanism comprising:
an engaging member provided to a first member; and
an engaged member provided to a second member, wherein:
the engaging member and the engaged member are freely detachably engageable with each other when the first member is moved relative to the second member in a predetermined direction;
the engaging member includes an engaging main part extending in the predetermined direction from the first member and an engaging claw part formed on a distal end of the engaging main part, the engaging main part and the engaging claw part being resiliently deformable, the engaging claw part having a concave curved engaging surface defined by a first continuously changing radius of curvature;
a convex curved engaged surface defined by a second continuously changing radius of curvature;
the convex curved engaged surface of the engaged member being received in the concave curved surface of the engaging surface of the engaging member, the engaging surface of the engaging claw part contacts the engaged surface of the engaged part at a linear contact area at a time from when the engaging claw part and the engaged part are in engagement with each other through to when the engaging claw part is disengaged from the engaged part wherein upon disengagement of the engaging claw part and the engaged part, the engaging member resiliently deforms away from the engaged member; and
a curvature of the engaging surface at the linear contact area is smaller than another curvature of the engaged surface at the linear contact area.

2. The engaging mechanism according to claim 1, wherein:
the engaging main part has a first side and a second side in the predetermined direction and has an inner surface and an outer surface, the inner surface extending linearly from the first side through to the second side at a first predetermined angle with respect to the predetermined direction, the first predetermined angle being between 0 degree to 5 degrees, the outer surface having a first part at the first side and a second part at the second side, the first part extending linearly in a direction slanting outward toward the second side, the second part formed continuous with the first part and being defined by a third curvature continuous curve to curve inwardly.

3. The engaging mechanism according to claim 1, wherein:
the engaging surface of the engaging claw part extends from an end of an inner surface of the engaging main part on the first side to a free end of the engaging claw part;
a tangent plane to the engaging surface of the engaging claw part that extends through the free end of the engaging claw part is angled by a second predetermined angle with respect to a reference plane, the reference plane being perpendicular to another reference plane and passing through the end of the inner surface, the another reference plane being perpendicular to the predetermined direction and passing through the free end of the engaging claw part;
the second predetermined angle is equal to or greater than 60 degrees and less than 90degrees.

4. The engaging mechanism according to claim 3, wherein, in the another reference plane, a first distance between the reference plane and the free end of the engaging claw part is equal to or greater than 0.3 times and equal to or less than 1.2 times a second distance between an outer surface of the engaging member and the reference plane.

5. The engaging mechanism according to claim 1, wherein the engaging claw part of the engaging member has a base part formed continuous from the engaging main part and a protrusion protruding from the base part, the protrusion having the engaged surface and another surface protruding outward in an arc, the protrusion having a width in the predetermined direction that grows larger toward the base part.

6. The engaging mechanism according to claim 1, wherein:
the engaging main part has a first side and a second side in the predetermined direction and has an inner surface, an outer surface, a first side surface, and a second side surface, the inner surface extending linearly from the first side through to the second side at a first predetermined angle with respect to the predetermined direction, the first predetermined angle being between 0 degree to 5 degrees, each of the first and second side surfaces having a first part at the first side and a second part at the second side, the first part extending linearly in a direction slanting outward toward the second side, the second part formed continuous with the first part and being defined by a third curvature continuous curve to curve inwardly.

* * * * *